US008259732B2

(12) United States Patent  (10) Patent No.: US 8,259,732 B2
Torsner  (45) Date of Patent: Sep. 4, 2012

(54) MEDIUM ACCESS CONTROL PRIORITY-BASED SCHEDULING FOR DATA UNITS IN A DATA FLOW

(75) Inventor: Johan Torsner, Masaby (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 683 days.

(21) Appl. No.: 10/572,683

(22) PCT Filed: Oct. 7, 2004

(86) PCT No.: PCT/SE2004/001438
 § 371 (c)(1),
 (2), (4) Date: Mar. 20, 2006

(87) PCT Pub. No.: WO2005/034418
 PCT Pub. Date: Apr. 14, 2005

(65) Prior Publication Data
 US 2007/0081513 A1  Apr. 12, 2007

(30) Foreign Application Priority Data
 Oct. 7, 2003 (SE) ........................................ 0302685

(51) Int. Cl.
 *H04L 12/56* (2006.01)
(52) U.S. Cl. .................... 370/395.4; 370/230; 370/396; 370/469; 370/349
(58) Field of Classification Search .................. 370/396, 370/230, 395.4, 328, 469, 349; 455/522
 See application file for complete search history.

(56) References Cited

U.S. PATENT DOCUMENTS

| 6,567,396 B1 * | 5/2003 | Pohjanvouri et al. ......... 370/349 |
| 6,594,278 B1 * | 7/2003 | Baroudi ........................ 370/466 |
| 6,643,813 B1 * | 11/2003 | Johansson et al. ............ 714/748 |
| 6,845,105 B1 * | 1/2005 | Olsson et al. ................. 370/469 |

(Continued)

FOREIGN PATENT DOCUMENTS

EP  1 361 689 A1  11/2003

(Continued)

OTHER PUBLICATIONS

Translation of Chinese official action, Feb. 6, 2009, in corresponding Chinese Application No. 200480029494.0.

(Continued)

*Primary Examiner* — Kibrom T Hailu
*Assistant Examiner* — Zewdu A Beyen
(74) *Attorney, Agent, or Firm* — Nixon & Vanderhye P.C.

(57) ABSTRACT

A data communication having at least one data flow is established over a wireless interface between a radio network and a user equipment node (UE). A medium access control (MAC) layer located in a radio network node receives data units from a higher radio link control (RLC) layer located in another radio network node. Some or all of a header of a RLC data units associated with the one data flow is analyzed at the MAC layer. Based on that analysis, the MAC layer determines a priority of the data unit relative to other data units associated with the one data flow. The MAC layer schedules transmission of higher priority data units associated with the one data flow before lower priority data units associated with the one data flow. The priority determination does not require extra priority flags or signaling.

24 Claims, 9 Drawing Sheets

U.S. PATENT DOCUMENTS

| | | | |
|---|---|---|---|
| 6,885,638 B2 * | 4/2005 | Xu et al. | 370/230 |
| 7,117,521 B2 * | 10/2006 | Puthiyedath | 725/107 |
| 2002/0037000 A1 * | 3/2002 | Park et al. | 370/349 |
| 2002/0194361 A1 * | 12/2002 | Itoh et al. | 709/233 |
| 2003/0016625 A1 * | 1/2003 | Narsinh et al. | 370/230 |
| 2003/0081690 A1 * | 5/2003 | Kim et al. | 375/264 |
| 2003/0093739 A1 * | 5/2003 | Han | 714/746 |
| 2003/0131124 A1 * | 7/2003 | Yi et al. | 709/236 |
| 2003/0153323 A1 | 8/2003 | Hwang | |
| 2003/0185186 A1 * | 10/2003 | Tsutsumi et al. | 370/338 |
| 2003/0202501 A1 * | 10/2003 | Jang | 370/346 |
| 2003/0210669 A1 * | 11/2003 | Vayanos et al. | 370/335 |
| 2003/0231594 A1 * | 12/2003 | Xu et al. | 370/236 |
| 2003/0232622 A1 * | 12/2003 | Seo et al. | 455/437 |
| 2004/0120284 A1 * | 6/2004 | Terry et al. | 370/329 |
| 2004/0146067 A1 * | 7/2004 | Yi et al. | 370/474 |
| 2004/0185892 A1 * | 9/2004 | Iacono et al. | 455/522 |
| 2005/0129044 A1 * | 6/2005 | Katayama | 370/412 |

FOREIGN PATENT DOCUMENTS

| | | |
|---|---|---|
| WO | 02/096044 A1 | 11/2002 |
| WO | 03/096617 A2 | 11/2003 |
| WO | 2004/057810 A2 | 7/2004 |

OTHER PUBLICATIONS

International Search Report of PCT/SE2004/001438, mailed Jan. 13, 2005.

* cited by examiner

AM RLC PDU Header

MEDIUM ACCESS CONTROL PRIORITY-BASED SCHEDULING FOR DATA UNITS IN A DATA FLOW

This application is the U.S. national phase of international application PCT/SE2004/001438, filed 7 Oct. 2004, which designated the U.S. and claims priority of SE 0302685-3, filed 7 Oct. 2003, the entire contents of each of which are hereby incorporated by reference.

TECHNICAL FIELD OF THE INVENTION

The present invention relates to a wireless communication system, and more particularly, to packet transmission scheduling of the High Speed Downlink Packet Access (HSDPA) system operated in a Universal Mobile Telecommunications System (UMTS) terrestrial radio access network (UTRAN).

BACKGROUND

The Universal Mobile Telecommunications System (UMTS) is a third generation mobile communication system, which evolved from the Global System for Mobile Communications (GSM), and is intended to provide improved mobile communication services based on a GSM core network (CN) and Wideband Code Division Multiple Access (WCDMA) access technology. FIG. 1 illustrates a UMTS terrestrial radio access network (UTRAN) defined in the third generation mobile communications standard 3GPP.

As shown in FIG. 1, the UTRAN 110 includes one or more radio network sub-systems (RNSS) 120 and 130. Each RNS 120,130 includes Radio Network Controller RNC 121, 131 and one or more Node Bs 122, 123, 132, 133 (the Node B is similar to a radio base station). For example, Node B 122 is managed by RNC 121, and receives information transmitted from the physical layer of the user equipment (UE) 150 (sometimes called a mobile terminal) through an uplink channel and transmits a data to the UE 150 through a downlink channel. The Node B acts as an access point of the UTRAN from the UE's point of view. The RNCs 121 and 131 allocate and manage radio resources of the UMTS and are connected to a suitable the core network depending on types of services provided to users. For example, the RNCs 121 and 131 are connected to a mobile switching center (MSC) 141 for a circuit-switched communication, such as a voice call service, and are connected to a Serving GPRS Support Node (SGSN) 142 for packet switched communication such as a wireless Internet service. The RNC in charge of a direct management of the Node B is called a Control RNC (CRNC). The CRNC manages common radio resources. On the other hand, the RNC that manages dedicated radio resources for a specific UE is called a Serving RNC (SRNC). The CRNC and the SRNC can be co-located in the same physical node. However, if the UE has been moved to an area of a new RNC that is different from SRNC, the CRNC and the SRNC may be located at physically different places.

The UMTS includes interfaces that operate as a communication path between various network elements. For example, the interface between a Node B and a RNC is called an Iub interface, and the interface between RNCs is called an Iur interface. The interface between the RNC and the core network is called an Iu interface.

As wireless Internet services have become popular, various services require higher data rates and higher capacity. Although UMTS has been designed to support multi-media wireless services, the maximum data rate is not enough to satisfy the required quality of services. Therefore, the 3GPP is conducting research directed to providing an enhanced data rate and radio capacity. One result of the research is the High Speed Downlink Packet Access (HSDPA). The purpose of the HSDPA system is to provide a maximum data rate of 10 Mbps and to improve the radio capacity in the downlink.

Various techniques in the HSDPA system include Link Adaptation (LA) and Hybrid Automatic Repeat reQuest (HARQ). In the LA method, the UTRAN can choose the appropriate modulation and coding scheme (MCS) according to the channel condition. For example, if the channel condition is good, LA uses 16 Quadrature Amplitude Modulation (QAM) to increase the throughput. If a channel condition is not as good, however, LA uses Quadrature Phase Shift Keying (QPSK) to increase the probability of success.

The HARQ method retransmits lost packets, but the exact operation is different than the retransmission method in the RLC layer. If one packet is corrupted during transmission, HARQ transmits another packet that contains the additional information for recovery. The retransmitted packet and the original packet are combined in the receiver. The retransmitted packet may contain the same information as that of the previously transmitted data, or may contain any additional supplementary information for data recovery.

Since the HSDPA system is an evolutional form of the UMTS system, the UMTS network needs to be maintained as much as possible to support backward compatibility and to reduce the cost of network deployment. To reduce the impact of the changes, most of the HSDPA features are supported in Node B so that other parts of the UMTS network will not be affected. Accordingly, some functions in Node B need to be changed and some MAC functions are transferred from the RNC. The MAC functionalities constitute a new MAC sublayer in Node B and it is called "MAC-hs" sublayer. The MAC-hs sublayer is placed above the physical layer, and performs packet scheduling and various other functions (including HARQ and LA). In addition, the MAC-hs sublayer manages a transport channel called an HSDPA-Downlink Shared Channel (HS-DSCH), which is used to deliver data from the MAC-hs sublayer to the physical layer.

FIG. 2 illustrates a protocol structure of a radio interface protocol defined in the 3GPP. The radio interface protocol horizontally includes a physical layer, a data link layer, and a network layer, and is vertically divided into a control plane for transmission of control information (signaling) and a user plane for transmission of data information. The user plane is a region through which user traffic such as voice information or IP (Internet Protocol) packets is transmitted, and the control plane is a region through which control information required for network maintenance and management is transmitted.

The protocol layer structure 200 includes a Radio Link Control (RLC) layer 210, a Medium Access Control (MAC) layer 220, and a physical layer 230. The physical layer (PHY) handles transmission of data using a wireless physical channel between the UE and the UTRAN. The typical functions of the physical layer include data multiplexing, channel coding, spreading, and modulation. The physical layer exchanges information with the Medium Access Control (MAC) layer through a transport channel. A transport channel is classified as a dedicated transport channel or a common transport channel depending on whether its use is dedicated to one UE or whether it is shared among several UEs.

The MAC layer is further partitioned onto a MAC-d sublayer 222 and a MAC-hs sublayer 224. The MAC-d sublayer performs a set of functions that includes (1) mapping logical channels to common and dedicated transport channels, (2) multiplexing one or more logical channels onto one transport channel (C/T MUX), (3) ciphering/deciphering, and so on. The MAC-d sublayer 222 provides data flows to a MAC-hs sublayer 224 described further below, with each data flow being associated with certain scheduling attributes. The MAC layer transmits data by using a suitable mapping between logical channels and transport channels. The MAC-d sublayer manages the dedicated transport channel, and a MAC-c/sh sub-layer which manages the common transport channel. The MAC-d sub-layer is located in the SRNC, and the MAC-c/sh sub-layer is located in the CRNC.

The radio link control (RLC) layer is responsible for reliable transmission of RLC protocol data units (PDUs). The RLC may segment or concatenate RLC service data units (SDUs) delivered from the higher layer. If the RLC PDUs are ready, they are delivered to the MAC layer and transmitted sequentially to the other node (UE or UTRAN). Sometimes, the RLC PDU can be lost during the transmission. In this case, the lost PDU can be retransmitted. The retransmission function of the RLC layer is called an Automatic Repeat reQuest (ARQ).

The RLC layer may include several RLC entities. Each of them performs an independent radio link control function. The operation mode of each RLC entity is one of a transparent mode (TM), an unacknowledged mode (UM), and an acknowledged mode (AM) depending on the adopted functions. In the RLC layer, data is processed as belonging to logical channels. There are various kinds of logical channels according to what kind of information the channel carries. The logical channel can be divided into two channels. One logical channel is a control channel for transmission of the control plane information and the other is a traffic channel for transmission of the user plane information.

The Packet Data Convergence Protocol (PDCP) layer is positioned over the RLC layer and efficiently transmits data of network protocols such as IPv4 or IPv6. For example, a header compression method in which header information of a packet is reduced can be used. The PDCP layer may include several independent PDCP entities like the RLC layer. The Broadcast/Multicast Control (BMC) layer is responsible for transmitting broadcast messages from a Cell Broadcast Center (CBS) positioned at a core network. The primary function of BMC is to schedule and transmit cell broadcast messages destined for a UE. The BMC layer, in general, uses an RLC entity operated in the unacknowledged mode in order to transmit broadcast messages. The Radio Resource Control (RRC) layer is a layer defined in the control plane. The RRC performs functions of establishment, reestablishment, and release of radio resources. In addition, the RRC layer can exchange control information between UE and UTRAN using RRC messages.

FIG. 3 illustrates a radio interface protocol for the HSDPA system. The MAC-hs sublayer is placed over the physical layer (PHY) in the Node B. In both the UE and UTRAN, the MAC-hs sublayer transfers data to the upper layer through MAC-c/sh and MAC-d sublayers. The MAC-c/sh and the MAC-d sublayers are located in the CRNC and the SRNC. A HS-DSCH Frame Protocol (FP) delivers the HSDPA data on the Iub or the Iur interface.

Radio link control (RLC) is typically operated in an acknowledged mode (AM) when used with HS-DSCH so that retransmissions are performed (when needed) between the radio network controller (RNC) and the user equipment (UE). Retransmission on MAC-hs level is also performed between the Node B and the UE for downlink data traffic. Since the Node B serves a large number of users, data to a particular UE for a particular priority data flow may need to be buffered in the Node B until it can be transmitted to that UE. If that UE uses several radio data flows with different priorities, low priority data may be buffered a significant period of time if higher priority data is available for transmission.

Because scheduling decisions are made at the Node-B in HSDPA, the Node-B must buffer data before transmission. The amount of data buffered can be negotiated with the RNC using a credit scheme. Of course, there is a certain delay associated with this negotiation procedure. The Node-B must send a capacity allocation message, which has to be processed by the RNC, and the associated data to be transmitted. This negotiation delay is referred to as "credit round-trip-time" (cRTT).

At any one time, the Node-B needs to store for each UE data flow enough data to satisfy all its transmissions that can take place during such a cRTT. Although it is possible to buffer enough data across all data flows for all data flows for all the UEs in the cell, this may lead to sub-optimal scheduling decisions driven by data availability rather than by channel conditions. If there is sufficient memory, better over-the-air performance is achieved if the Node-B distributes enough credits for all data waiting at the RNC. Acknowledged Mode (AM) RLC relies on retransmissions to achieve a desired residual frame error rate. Re-transmissions are triggered by sending feedback information on the status of each packet. The amount of buffering required in order to avoid "stalling", i.e. the transmit and re-transmit buffers are full and cannot accept more data, is proportional to the over-the-air throughput and to the re-transmission round-trip-time (rRTT). The rRTT is the time between the time when a "hole" in the packet sequence numbers is detected by the receiver and the time when the packet is re-transmitted. It is desirable to reduce the rRTT to reduce the RLC buffer size or to improve RLC performance at equal RLC buffer size.

Currently, the Frame Protocol (FP) used between the HS-DSCH in Node B and in the RNC does not identify the type of RLC packet being sent down, i.e., whether the packet is a first time transmitted packet or a re-transmitted packet. This means that in addition to the status report transmission delay, the rRTT will also include buffering delays at the Node-B. The larger the amount of data sitting in the Node-B buffer, the longer the rRTT.

The buffering delay in Node B affects the RLC retransmission round trip time (rRTT) and negatively impacts the RLC performance in terms of delay and throughput. The rRTT is reduced by introducing different priorities for different types of RLC packet data units (PDUs) in a single data flow. For example, "status" PDUs, i.e. ARQ feedback information transmitted in the downlink direction to the UE, have a high priority. For uplink traffic, performance is improved by transmitting the RLC status PDUs as quickly as practical in the Node B. As another example, "retransmitted" PDUs are given a higher priority than PDUs transmitted for the first time. For downlink traffic, prioritizing retransmitted PDUs over PDUs transmitted for the first time permits faster delivery of UE data to higher protocol layers. Because AM RLC uses in-order delivery, data is delivered in the same order it was transmitted from the RNC RLC entity. If an RLC PDU is missing, all PDUs with higher sequence numbers are buffered until the missing PDU is received. Thus, a missing PDU causes delay for all subsequent data. Performance is improved by assuring that the missing PDUs, i.e. retransmissions, are prioritized.

SUMMARY OF THE INVENTION

The priority levels for different types of RLC PDUs in a data flow could be signaled over the Iub interface as part of the frame handling protocol. For example, a 2-bit field indicating the PDU priority could be sent between the RNC and the Node B. But this approach requires additional signaling from the RNC to the Node B. That extra signaling is avoided by the Node B autonomously classifying RLC PDUs based on content in the RLC PDU header. Even though the node B normally does not contain any RLC "awareness," that RLC awareness is implemented in the Node B to allow the Node B to check some or all of each RLC PDU header and/or RLC payload, if desired.

The above-identified technology relates to transferring data in a wireless communication system over a wireless interface between a radio network and a user equipment node (UE). A communication is established with the UE having at least one data flow. A medium access control layer located in a radio network node receives data units from a higher radio link control layer located in another node. Some or all of a header of a radio link control data unit associated with the one data flow is analyzed at the medium access control layer. Based on that analysis, the medium access control layer determines a priority of the data unit relative to other data units associated with the one data flow. The medium access control layer schedules transmission of higher priority data units associated with the one data flow before lower priority data units associated with the one data flow. The priority may be determined based on radio link control unit header information that does not explicitly indicate a priority for the data unit relative to other data units associated with that data flow.

In one non-limiting example implementation, a determination is made whether the data unit is a control type of data unit or a data type of data unit, and the priority determination is based on the determined data unit type. In another non-limiting example implementation, retransmission of a previously-transmitted data unit associated with the one data flow is prioritized over an original transmission of a data unit associated with the one data flow. One non-limiting example way of determining retransmission data units is to determine a highest sequence number of multiple data units associated with the one data flow and then determine which of the other data units is a retransmission based on the determined highest sequence number.

Data units associated with the one data flow are preferably stored in memory at the medium access control layer so that higher priority data units are accessed for transmission before lower priority data units. In one non-limiting example implementation, duplicate data packets are removed from the memory to reduce delay and increase efficiency. If desired, payload information of the radio link control data unit may be analyzed and used in prioritizing the data unit. For example, if a polling bit is set in a first data unit associated with the one data flow, the polling bit in the header of a second data unit associated with the one data flow with a priority higher than that of the first data unit may be set to initiate an earlier polling.

In a non-limiting example implementation, the radio network node is a Node B in a UMTS type system, which is coupled to a radio network controller. The medium access control layer is a high speed-down link shared channel (HS-DSCH) medium access control layer implemented in the Node B. One of the benefits of the above-described approach is that it does not rely on priority-specific signaling from the RNC to the Node B to perform the data unit priority determination. In that way, there is no need to modify the RNC to insert priority type information in the data unit headers or to send explicit priority-based control signaling to the Node B. By making the Node B "RLC aware" the Node B can make the priority determination from existing information in the RLC PDU.

DETAILED DESCRIPTION

The following description sets forth specific details, such as particular implementations, procedures, techniques, etc. for purposes of explanation and not limitation. It will be appreciated by one skilled in the art that other implementations may be employed a part from these specific details. For example, although the following description is facilitated using non-limiting UMTS examples, the present invention may be employed in any mobile communications network that supports data services. In some instances, detailed descriptions of well-known methods, interfaces, circuits and signaling are omitted so as to not obscure the description with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific circuitry (ASIC), and/or using one or more digital signal processors (DSPs).

Figure 1:
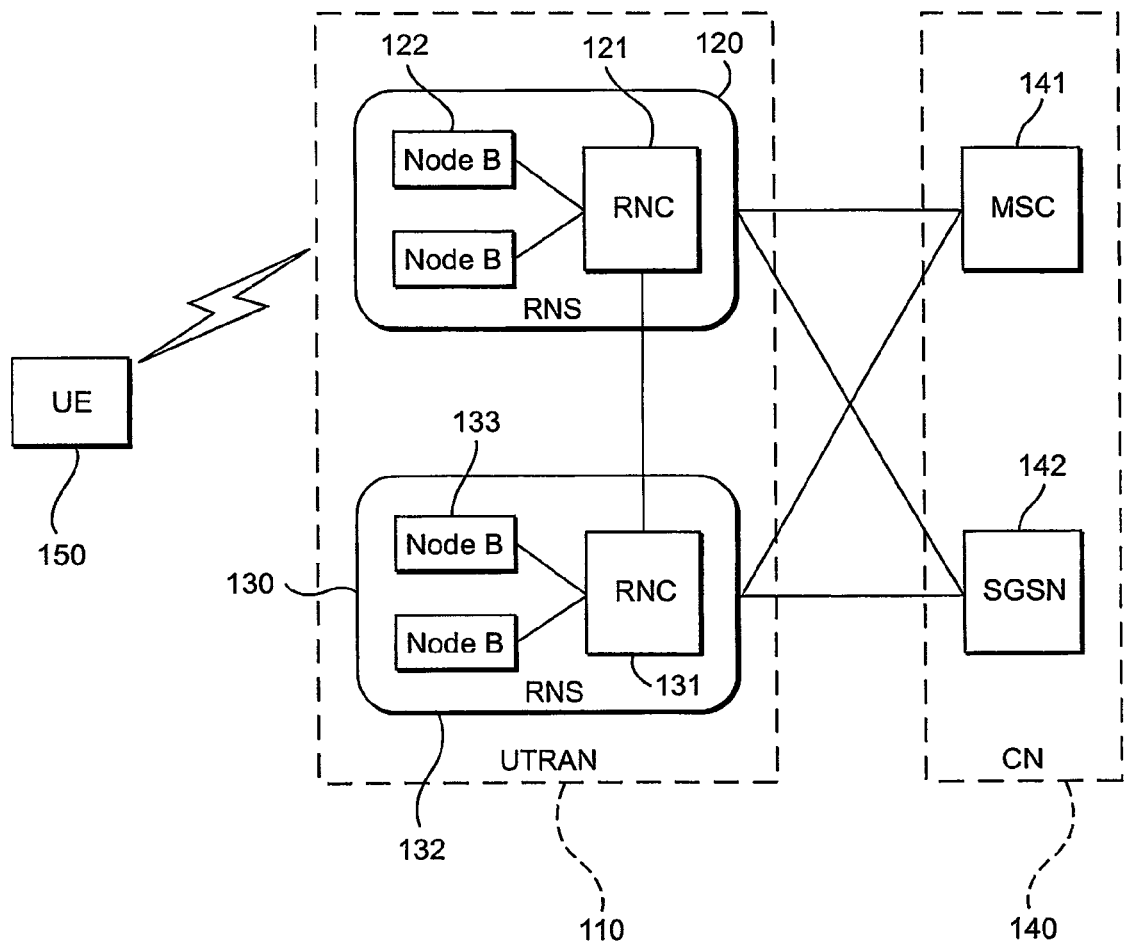
FIG. 1 illustrates in block format a UMTS type system.
Figure 2:
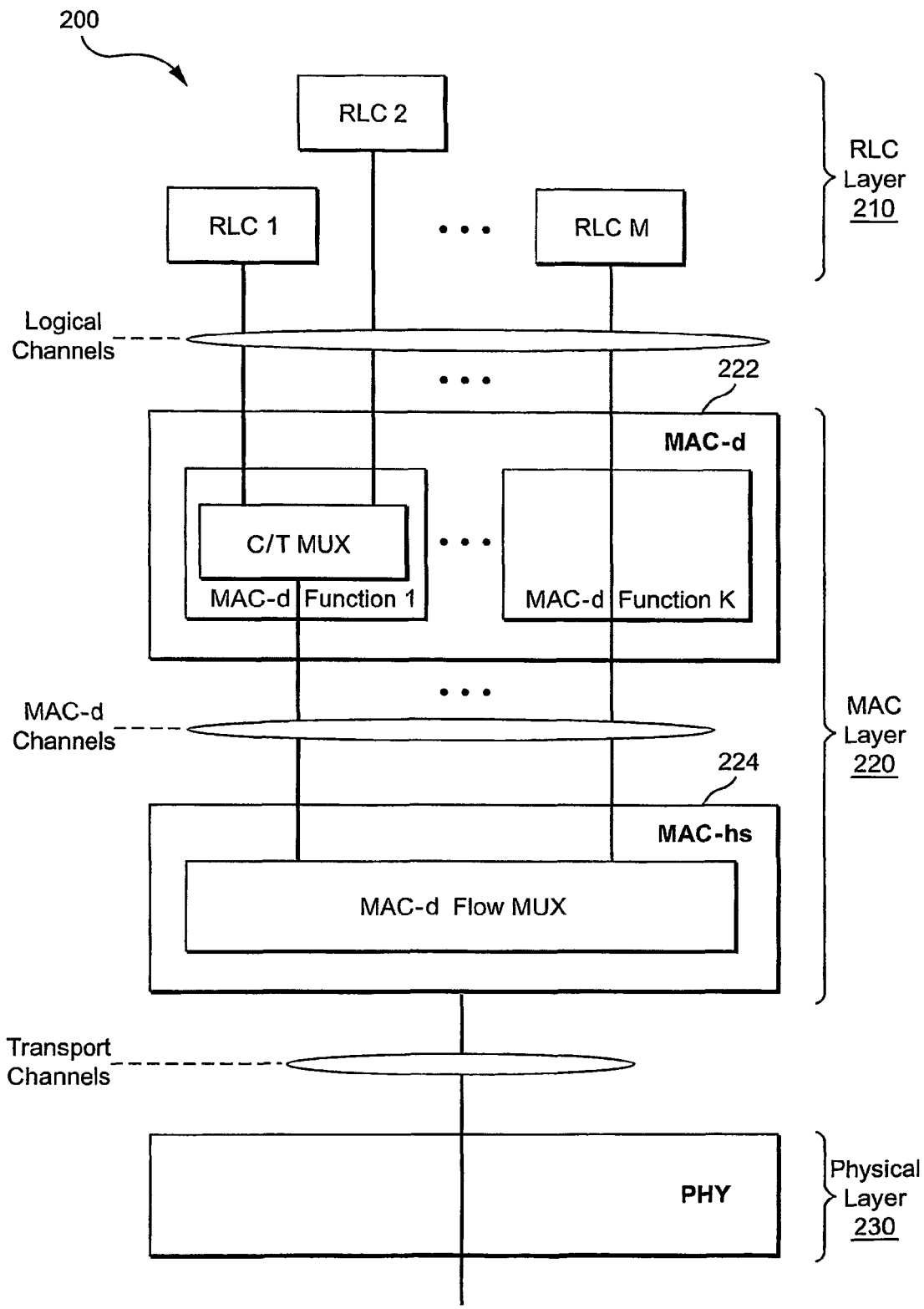
FIG. 2 illustrates 3 protocol layers used in the UMTS system shown in FIG. 1.
Figure 3:
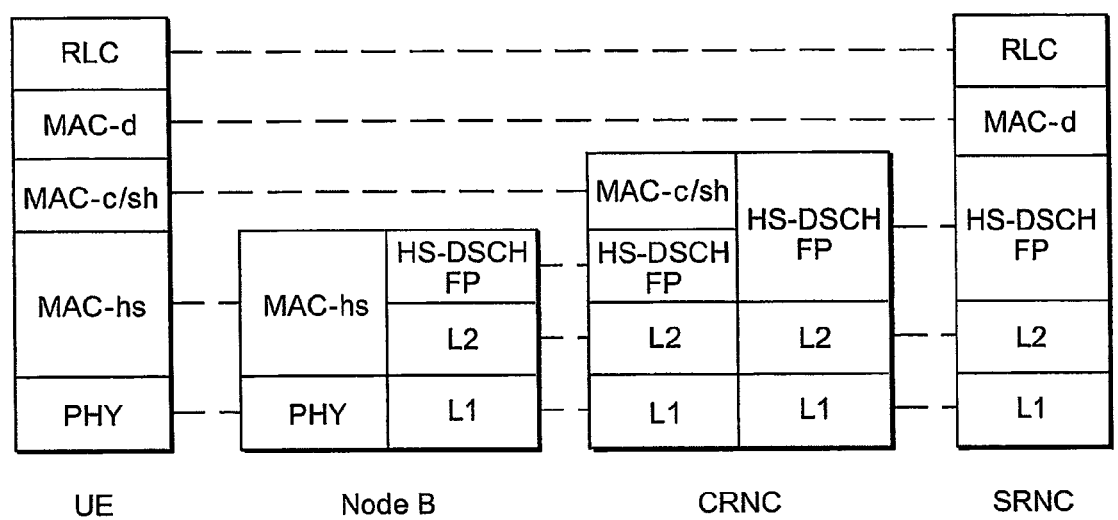
FIG. 3 is a protocol layer diagram that applies specific protocols to particular nodes in the system shown in FIG. 1.
Figure 4:
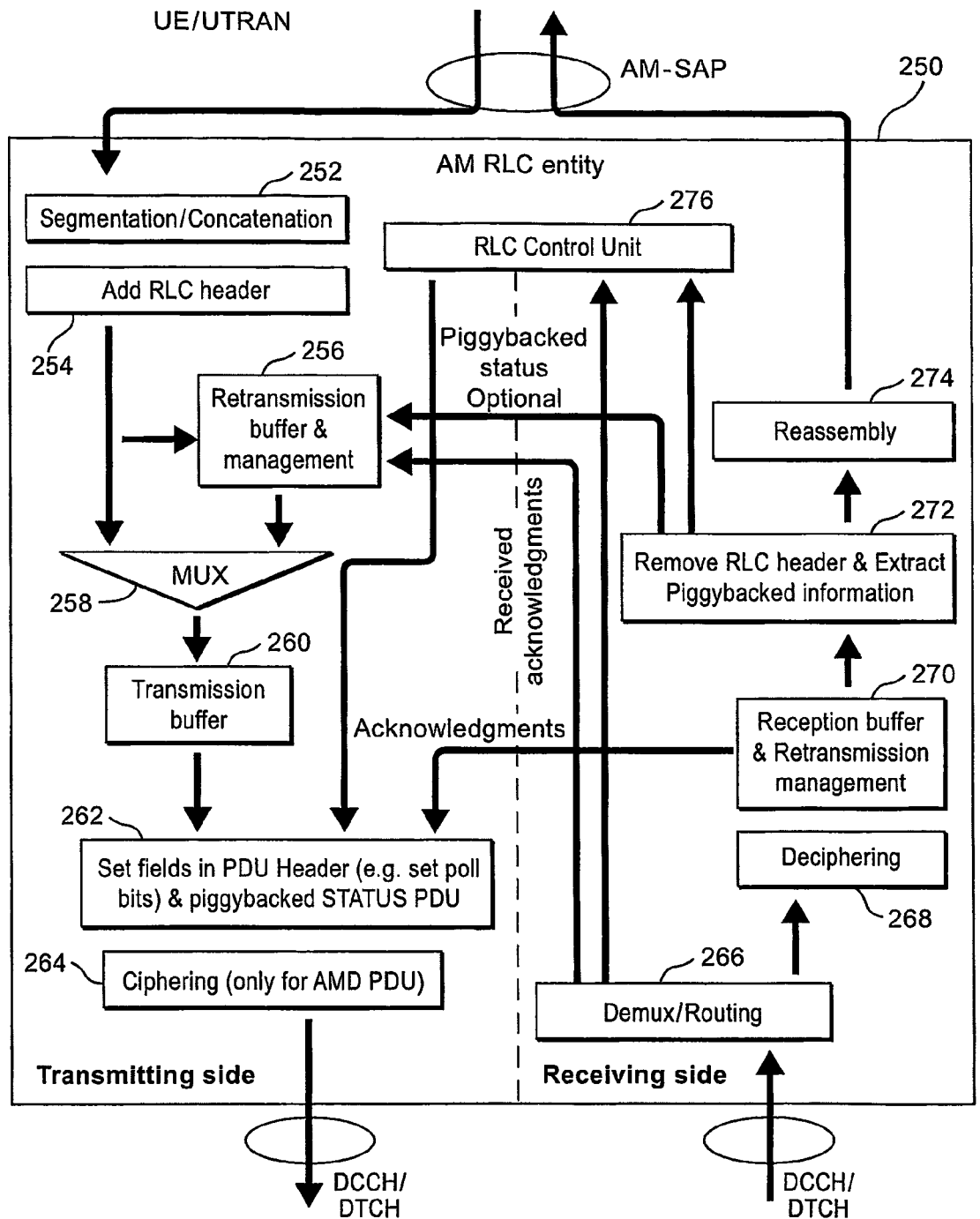
FIG. 4 is a function block diagram of an acknowledge mode RLC entity in the RNC.

Building on the description of the UMTS system shown in FIG. 1 and the RLC, MAC, and physical layer protocols shown in FIGS. 2 and 3, FIG. 4 illustrates a model of an acknowledged mode (AM) entity 250 contained in the radio network controller (RNC) and focuses on the transmitting side of the AM/RLC entity which transmits RLC packet data units (PDUs). The word "transmitted" in the context of FIG. 4 includes submitting to a lower protocol layer. The AM RLC entity 250 is shown configured to use one logical channel to send or receive PDUs (although more than one logical channel could be used). RLC entity 250 receives RLC service data units (SDUs) from upper protocol layers through an AM-service access point (SAP). The RLC SDUs are segmented and/or concatenated 252 into acknowledged mode data (AMD) PDUs of a fixed length. The segmentation is performed if the received RLC SDU is larger than the length of available space in the AMD PDU.

After segmentation/concatenation 252, the RLC header is added 254, and the RLC PDUs are placed in a retransmission buffer 256 and provided to multiplexer 258. RLC PDUs buffered in the retransmission buffer 256 are deleted or retransmitted based on a status report included a status PDU that comes from the receiving side, and ultimately from the UE, or piggybacked status PDUs sent by a peer RLC entity. The status report may contain positive or negative acknowledgements of individual RLC PDUs. The multiplexer 258 multiplexes RLC PDUs from the retransmission buffer 256 that need to be retransmitted and newly-generated RLC PDUs delivered from the add RLC header block 254. The output of the multiplexer is provided to a transmission buffer 260, from which buffer PDUs are delivered to a function that completes the PDUs RLC PDU header, e.g., set poll bits, and potentially replaces padding with piggybacked status information (see block 262). If required, block 266 also multiplexes control PDUs received from the RLC control unit 274 (e.g., reset and reset acknowledged PDUs) and from the reception 268 (e.g., piggybacked status and status PDUS) with the data PDUs. optional ciphering may occur in block 262. The RLC PDUs are transmitted to the lower MAC layer through a dedicated control channel (DCCH) or a dedicated traffic channel (DTCH).

On the receiving side of the RLC entity 250, a demultiplexer/routing block 264 receives data and control PDUs through configured logical channel from the lower protocol layer. Data PDUs are routed to the deciphering unit 266, if ciphering was used, and delivered to a session buffer 268. Those PDUs are held in the buffer 268 until the complete RLC SDU has been received. The receiver acknowledges successful reception or request retransmission of the missing data PDUs by sending one or more status PDUs to its transmitting side as shown in FIG. 4. If a piggybacked status PDU is found in a PDU, it is delivered to the retransmission buffer 256 on the transmitting side in order to purge the buffer 256 of positively acknowledged PDUs and to indicate which PDUs need to be transmitted. Once a complete RLC SDU has been received, the RLC header is removed and piggyback information is extracted in block 270, and the associated AMD PDUs are reassembled by reassembly unit 272 and delivered to upper protocol layers through the AM-service access point. Reset and reset acknowledge PDUs are delivered to the RLC control unit 374 for processing. Received status PDUs are delivered to the retransmission buffer 256 in order to purge the buffer positively acknowledged AMD PDUs and to indicate which AMD PDUs need to be retransmitted. More details of the RLC layer can be found in the Technical Specification 3GPP TS25.322 "Radio Link Control Protocol Specification" by the 3rd Generation Partnership Project.

Figure 5:
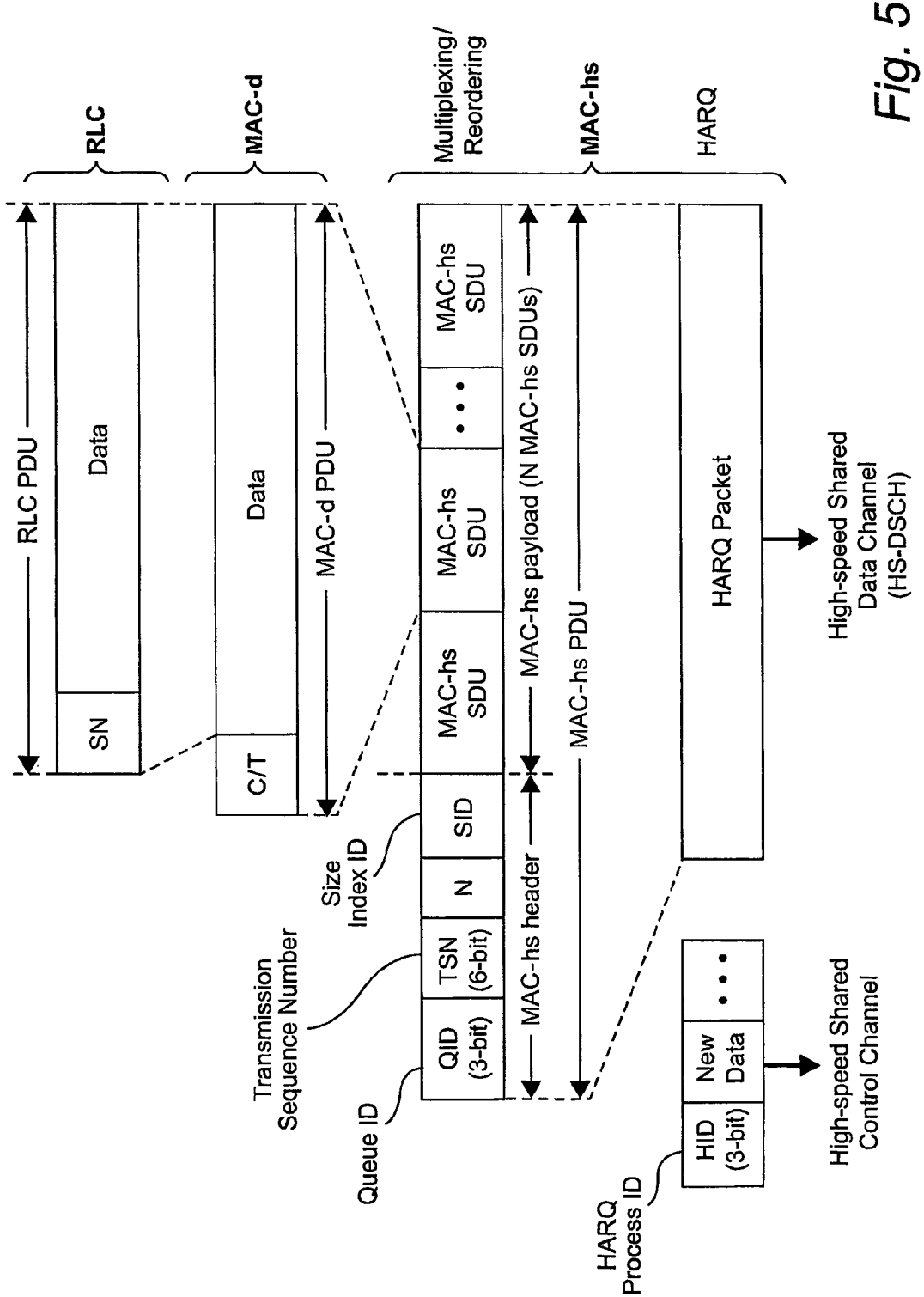
FIG. 5 illustrates various formats of PDUs and packets that radio link control and medium access control protocol layers.

FIG. 5 shows a diagram illustrating the data encapsulation performed by a Node B for transmission on the HS-DSCH. In W-CDMA, data to be transmitted on the downlink is provided by the RLC layer in RLC protocol data units (RLC PDUs), each of which includes a sequence number (SN) and data. The MAC-d sublayer receives the RLC PDUs for one or more logical channels and, for each RLC PDU, inserts a (C/T) field to form a corresponding MAC-d PDU. The C/T field identifies the logical channel associated with the RLC PDU.

The MAC-hs sublayer receives the MAC-d PDUs and forms MAC-hs PDUS. Each MAC-d flow may include data for one or more logical channels at the RLC layer, and may be associated with a particular priority. Since data is transmitted based on priority and available resources, data flows with different priorities are stored in different data flow priority queues within the MAC-hs sublayer. Thereafter, data is retrieved from the proper priority queue, as needed, and further processed for transmission on the HS-DSCH.

To form a MAC-hs PDU, the MAC-hs sublayer first receives and serially concatenates one or more MAC-d PDUs from a particular data flow priority queue to form the payload for the MAC-hs PDU. Padding bits may be added as necessary to fill out the payload. The MAC-hs sublayer then adds a header with the payload to form the MAC-hs PDU.

The MAC-hs header includes (1) a size index ID (SID) field indicative of the length of each MAC-d PDU in the MAC-hs PDU, (2) an N field indicative of the number of MAC-d PDUs included in the MAC-hs PDU, (3) a transmission sequence number (SN) assigned to and used to uniquely identify the MAC-hs PDU, and (4) a Queue ID (QID) field indicative of the specific priority queue from which the MAC-d PDUs included in the MAC-hs PDU were retrieved. The SN allows the UE to identify MAC-hs PDUs that have been recovered and is used to provide MAC-d PDUs in-order to the RLC layer, which expects data to be delivered to it in the correct sequence. MAC-hs PDUs are generated on the fly as they are needed. Each MAC-hs PDU is transmitted in a 2 msec transmission time interval (TTI), which is the transmission unit on the HS-DSCH.

Control information is concurrently transmitted on the shared HS-SCCH along with each packet transmission. This control information includes (1) an HARQ process ID (HID), (2) a New Data indicator, (3) information identifying the specific UE to which the control information and the corresponding data transmission are intended, and (4) other information. The HID indicates the specific HARQ process used for the packet. Each packet may be transmitted and possibly retransmitted one or more times until (1) the UTRAN receives an ACK feedback on the HS-DPCCH for the packet, or (2) the transmitter decides to abandon the transmission of the packet. Each packet is associated with a specific HARQ process, which is an instance of a stop-and-wait (SAW) protocol used to control the transmission/retransmission of that packet. Since three bits are defined for the HID, up to eight packet transactions may be pending at any given moment. The eight HARQ processes may thus be viewed as eight "HARQ channels" that may be used to transmit packets, with each HARQ channel being associated with and identified by a specific HID value.

Figure 6:
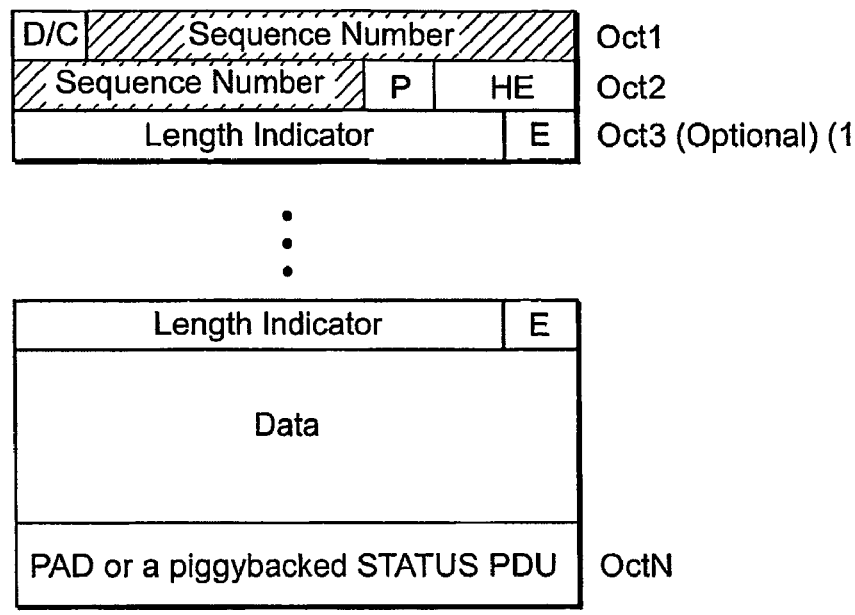
FIG. 6 illustrates an acknowledge mode radio link control packet data unit header. p
Figure 7:
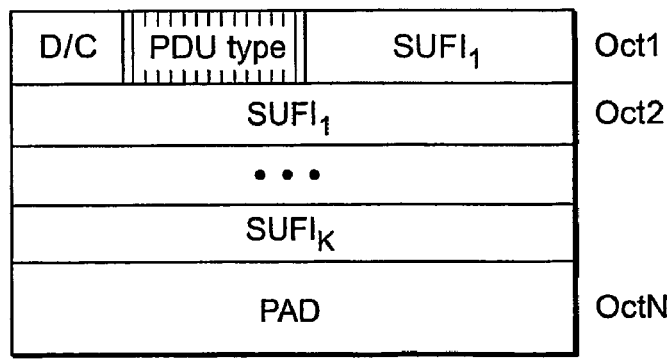
FIG. 7 illustrates an acknowledge mode radio link control status packet data unit.

An AM RLC PDU format is shown in FIG. 6. The data/control (D/C) field indicates whether the RLC PDU is an acknowledged mode data (AMD) PDU (data PDU) or a control PDU. For a control PDU format shown in FIG. 7, the PDU type field indicates if the PDU is a STATUS PDU, a RESET PDU, or a RESET ACK PDU.

Figure 8:
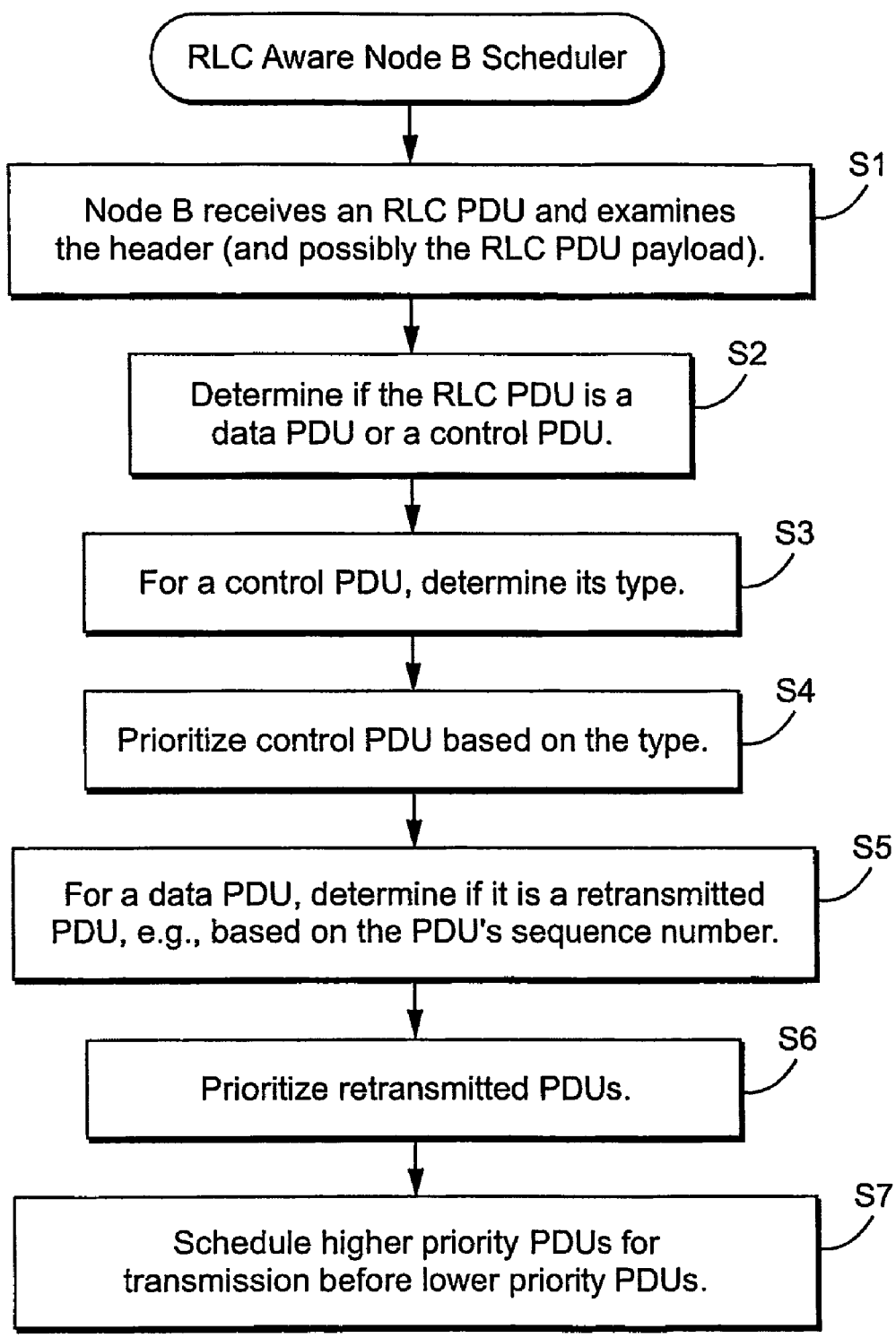
FIG. 8 illustrates an example procedures for an "RLC aware" Node B PDU scheduler.

Reference is now made to the "RLC aware" Node B scheduler flow chart in FIG. 8. Node B receives an RLC PDU from the RNC. Normally, the node B does not examine the contents of any data unit received from an upper protocol layer such as the RLC layer. But the RLC aware Node B examines all or part of the RLC PDU header (step S1). The Node B may also examine the contents of parts or all of the RLC PDU payload depending on the application and the type of priority decision making desired. A determination is made whether the RLC PDU is a data type PDU or control type PDU (step S2). For a control PDU, the specific type of control PDU is determined (step S3), and the control PDU is prioritized based on that determined type (step S4). For example, all status PDUs can be given a higher priority than data PDUs which improves the performance of uplink data traffic. Data PDUs with the poll bit set to one "1" may also be prioritized over other data PDUs. For a data PDU, a determination is made whether it is a retransmitted PDU or an originally-transmitted PDU (step S5). Although any technique may be used to determine if a PDU is transmitted, one example, non-limiting technique makes that determination based on the PDU's sequence number. The highest received sequence number is stored, and all PDUs with lower sequence numbers are considered to be retransmissions. In making this decision, the modulo nature of the sequence numbers should be considered. Retransmitted PDUs are prioritized over originally-transmitted PDUs (step S6). The Node B schedules higher priority PDUs one data flow for transmission before lower priority PDUs one data flow (step S7).

For a particular data flow, transmitting PDUs with high priority before PDUs with lower priority results in a lower average delay for the high priority PDUs. More generally, this priority scheduling for PDUs associated with one data flow decreases the various delays described in the background and the application and improves the performance of the data transmission. Reducing the round trip time for selected RLC PDUs associated with a data flow improves performance in terms of delay and throughput. Advantageously, the scheme does not rely on explicit signaling from the RNC to the Node B and can be implemented with current 3GPP specifications.

If the Node B analyzes the payload contents of RLC signals in addition to the RLC header, it may perform other performance enhancing functions. For example, if the same RLC PDU is present more than once in the buffer, (e.g., due to RLC level retransmissions), the Node B removes duplicate PDUs and only transmits the first instance of the PDU. Moreover, if the polling bit is set in a first RLC PDU in the buffer, the Node B can modify the header of a second RLC PDU located earlier in the data flow buffer and set the poll bit in that second RLC PDU instead, (and if desired remove the poll bit from the first PDU), thus reducing the time until the poll is received in the UE.

Figure 9:
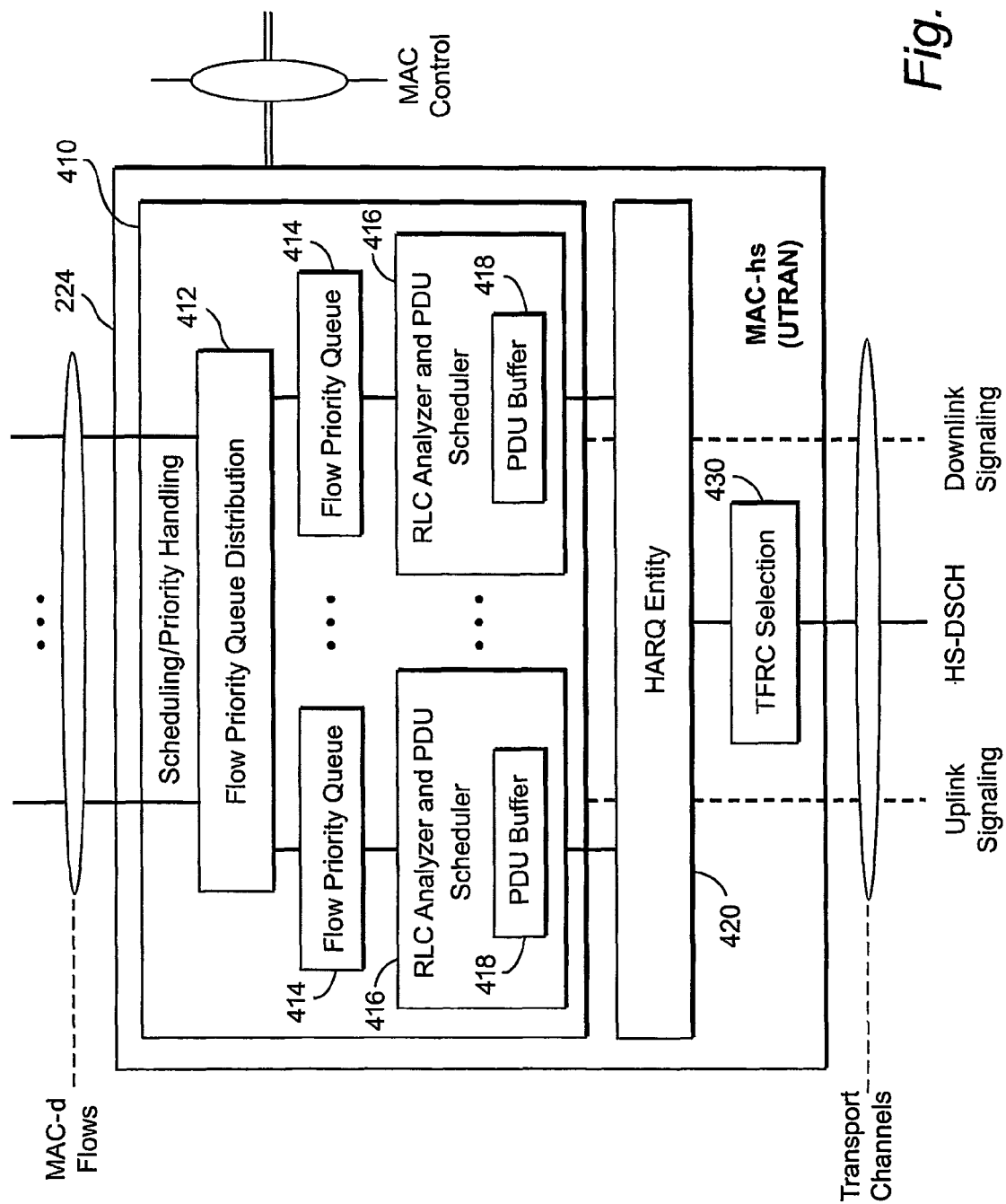
FIG. 9 illustrates a non-limiting example implementation in a Node B scheduler for a high speed downlink shared channel.

FIG. 9 is a diagram of the MAC-hs entity 224 which handles data transmitted on the HS-DSCH and manages physical resource allocation for HSDPA. The UTRAN MAC-hs entity includes a scheduling/priority handling entity 410, an HARQ entity 420, and an TFRC selection entity 430. The TFRC entity 430 selects the appropriate transport format and resources for the data to be transmitted on the HS-DSCH. The scheduling/priority handling entity 410 manages the data flows from the MAC-d entity according to their priorities, determines the data flow priority queue 414 for each MAC PDU being processed, and determines the transmission/retransmission of PDUs. The Node B scheduler 410 also includes an RLC analyzer and PDU scheduler 416 for processing PDUs per flow from that flow's priority queue 414. The RLC analyzer and PDU scheduler 416 includes a PDU buffer 418 in which higher priority PDUs are stored for earlier transmission than lower priority PDUs. The RLC analyzer and PDU scheduler 416 performs additional priority analysis over and above what is normally performed in the scheduler 410 for data flow priority. As one example, it may implement the procedures described above in FIG. 8 based upon the analysis of the RLC PDU header, and if desired, the payload of the RLC PDU. One HARQ 420 entity is provided to handle HARQ functionality for each UE. The HARQ entity performs transmission and (if necessary) retransmissions of packets to ensure reliable delivery of these packets to the UE. Retransmissions of packets are performed based on ACK/NAK feedback from the UE.

Figure 10:
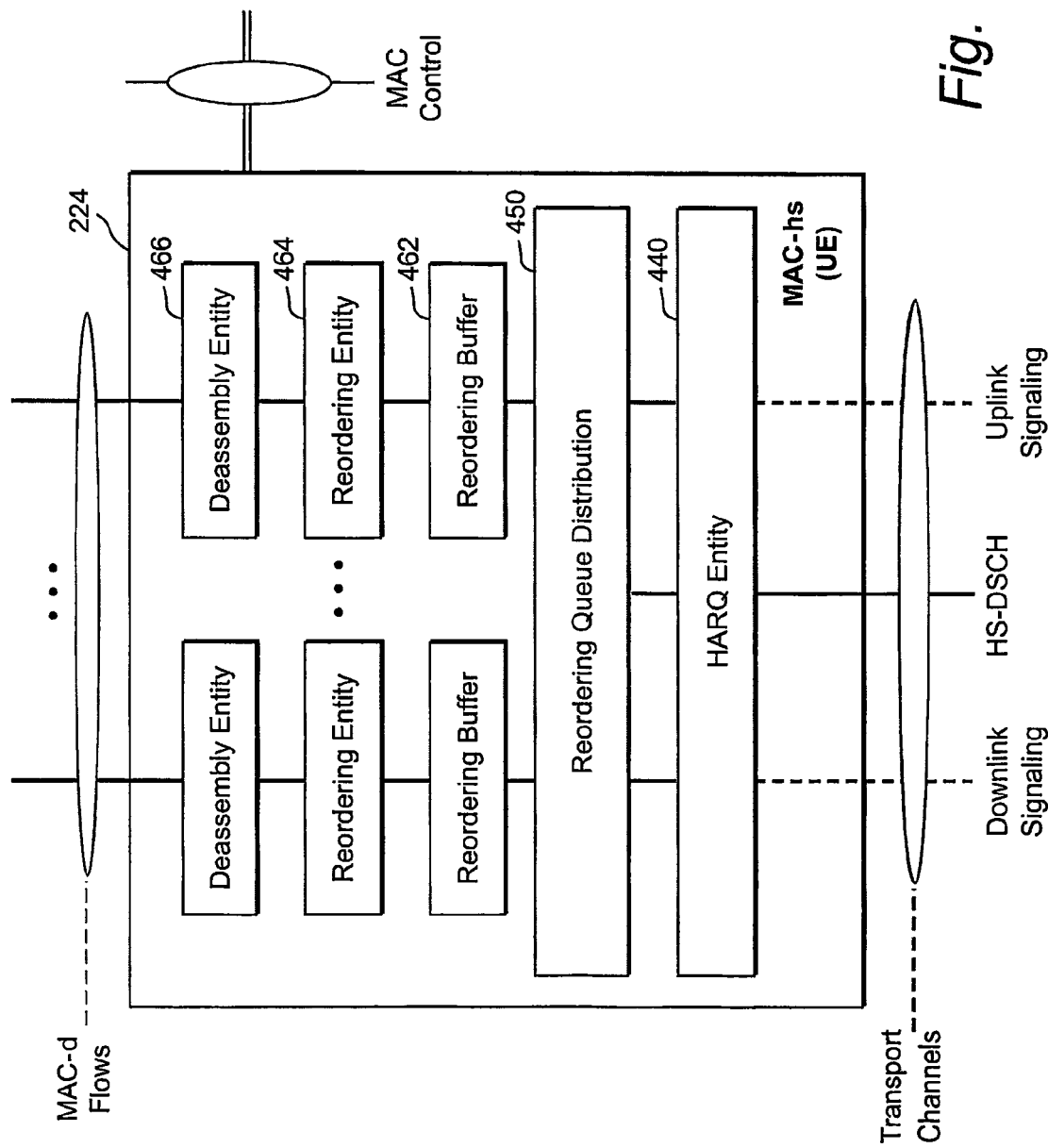
FIG. 10 illustrates a complementary diagram of the various medium access control layer entities for receiving high speed downlink shared channel transmissions at a UE.

FIG. 10 is a diagram of a MAC-hs entity 224 for the UE side. The MAC-hs entity 224 handles HSDPA specific function and includes an HARQ entity 440, a re-ordering queue distribution entity 450, and one set of re-ordering buffer 462, re-ordering entity 464, and de-assembly entity 466 for each Queue ID configured at the UE. One re-ordering buffer 462 is thus provided for and is associated with each priority queue used for the UE. The UE HARQ entity 440 handles all tasks required for HARQ (e.g., generates the required ACK/NAK for each received packet transmission). The re-ordering queue distribution entity provides recovered packets to the proper re-ordering buffer based on the Queue ID sent for the packet. The reordering entity for each re-ordering buffer reorders the recovered packets in the buffer according to the SN assigned to each packet. Each priority queue is associated with its own sequence of SNs. The reordering entity then provides packets with consecutive SNs, as they are recovered, to the de-assembly entity. The packets are not delivered to the de-assembly entity (i.e., "stalled") if packets with lower SNs are missing. The de-assembly entity associated with each re-ordering buffer de-assembles the packets by removing the header in each packet to obtain the MAC-hs payload, extracting the MAC-d PDUs included the MAC-hs payload, and discarding padding bits (if any). The de-assembly entity then provides the MAC-d PDUs to higher layers via the MAC-d sublayer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

The invention claimed is:

1. A method implemented in a radio base station for transferring data in a wireless communications system over a wireless interface between a radio network and a user equipment node (UE), comprising the base station performing the following steps:
    establishing a communication with the UE having at least one data flow;
    receiving data units from a radio link control layer in another node other than the base station, where the radio link control layer is a higher protocol layer than a medium access control layer;
    analyzing at the medium access control layer some or all of a radio link control layer header of a radio link control data unit received from the another node and associated with the one data flow;
    based on the analysis, determining at the medium access control layer a priority of the data unit relative to other data units associated with the one data flow; and
    scheduling at the medium access control layer transmission of higher priority data units associated with the one data flow before lower priority data units associated with the one data flow,
    wherein the radio network includes a radio network controller (RNC) coupled for communication with the radio base station, and wherein the higher radio link layer is a radio link control (RLC) layer implemented in the RNC and the medium access control layer is a high speed-downlink shared channel (HS-DSCH) medium access control layer implemented in the radio base station, and
    wherein the method does not rely on priority-specific signaling from the RNC to the radio base station to perform the determining step.

2. The method in claim 1, wherein the analyzing step includes determining the priority based on radio link control data unit header information that does not explicitly indicate a priority for the data unit.

3. The method in claim 2, wherein the determining step further comprises : determining a type of control data unit, and determining the priority based on the determined the type of control data unit.

4. The method in claim 2, further comprising:
    storing data units associated with the one data flow in memory at the medium access control layer so that higher priority data units are accessed for transmission before lower priority data units.

5. The method in claim 4, further comprising:
removing duplicate data packets from the memory.

6. The method in claim 4, wherein the analysis further comprises:
analyzing information in a payload portion of the radio link control data unit.

7. The method in claim 6, wherein the determining step further comprises: if a polling bit is set in a first data unit associated with the one data flow, setting the polling bit in the header of a second data unit associated with the one data flow with a priority higher than that of the first data unit.

8. The method in claim 1, wherein the determining step further comprises: determining whether the data unit is a control type of data unit or a data type of data unit, and determining the priority based on the determined data unit type.

9. The method in claim 1, wherein the method is performed in a radio base station and the determining step further comprises:
prioritizing retransmission of a previously-transmitted data unit associated with the one data flow over an original transmission of a data unit associated with the one data flow.

10. The method in claim 1, wherein the determining step further comprises: determining a sequence number for the data unit, and determining the priority based on the determined sequence number.

11. The method in claim 10, wherein the determining step further comprises: determining a highest sequence number of multiple data units associated with the one data flow, and determining which of the other data units associated with the one data flow is a retransmission based on the determined highest sequence number.

12. The method in claim 11, wherein the determining step further comprises: taking into account a modulo sequence numbering in determining which data units are retransmissions.

13. A node in a radio network for use in facilitating a communication includes at least one data flow over a wireless interface with a user equipment node (UE), where the node is a radio base station which comprises:
a medium access controller for receiving data units from a higher radio link controller included in a radio network controller (RNC), the medium access controller being further configured to:
analyze some or all of a radio link control layer header of a radio link control data unit associated with the one data flow;
determine, based on the analysis, a priority of the one data unit relative to other data units associated with the one data flow; and
schedule transmission of higher priority data units associated with the one data flow before lower priority data units associated with the one data flow,
wherein the medium access controller is a high speed-downlink shared channel (HS-DSCH) medium access control layer implemented in the radio base station, and
wherein the medium access controller is further configured to not rely on priority-specific signaling from a radio network controller (RNC) to the radio base station to determine the priority of the one data unit.

14. The node in claim 13, wherein the medium access controller is configured to determine the priority based on radio link control data unit header information that does not explicitly indicate a priority for the data unit.

15. The node in claim 14, further comprising: a buffer for storing data units associated with the one data flow at the medium access control layer so that higher priority data units are accessed for transmission before lower priority data units.

16. The node in claim 15, wherein the medium access controller is configured to: analyze information in a payload portion of the radio link control data unit.

17. The node in claim 16, wherein the medium access controller is configured to: determine if a polling bit is set in a first data unit associated with the one data flow, and if so, set the polling bit in the header of a second data unit associated with the one data flow with a priority higher than that of the first data unit.

18. The node in claim 14, wherein for a control type of data unit, the controller is configured to: determine a type of control data unit, and determine the priority based on the determined the type of control data unit.

19. The node in claim 13, wherein the medium access controller is configured to: determine whether the data unit is a control type of data unit or a data type of data unit, and determine the priority based on the determined data unit type.

20. The node in claim 13, wherein the medium access controller is configured to: prioritize retransmission of a previously-transmitted data unit associated with the one data flow over an original transmission of a data unit associated with the one data flow.

21. The node in claim 13, wherein the medium access controller is configured to: determine a sequence number for the data unit, and determine the priority based on the determined sequence number.

22. The node in claim 21, wherein the medium access controller is configured to: determine a highest sequence number of multiple data units associated with the one data flow, and determine which of the other data units associated with the one data flow is a retransmission based on the determined highest sequence number.

23. The node in claim 22, wherein the medium access controller is configured to: take into account a modulo sequence numbering in determining which data units are retransmissions.

24. A mobile radio communications system including the node in claim 13.

* * * * *